US012406599B2

(12) United States Patent
Liu

(10) Patent No.: US 12,406,599 B2
(45) Date of Patent: Sep. 2, 2025

(54) INNOVATIVE MAGNETIC LIGHT-EMITTING SIGN

(71) Applicant: HiNeon Technologies Inc, Vancouver (CA)

(72) Inventor: Chao Liu, Vancouver (CA)

(73) Assignee: HiNeon Technologies Inc, Vancouver (CA)

(*) Notice: Subject to any disclaimer, the term of this patent is extended or adjusted under 35 U.S.C. 154(b) by 0 days.

(21) Appl. No.: 18/273,345

(22) PCT Filed: Nov. 18, 2022

(86) PCT No.: PCT/CN2022/133017

§ 371 (c)(1),
(2) Date: Jul. 20, 2023

(87) PCT Pub. No.: WO2023/134301

PCT Pub. Date: Jul. 20, 2023

(65) Prior Publication Data

US 2024/0087484 A1 Mar. 14, 2024

(30) Foreign Application Priority Data

Jan. 12, 2022 (CN) ......................... 202220075442.2

(51) Int. Cl.
*G09F 13/04* (2006.01)
*F21V 3/02* (2006.01)
(Continued)

(52) U.S. Cl.
CPC ............ *G09F 13/0404* (2013.01); *F21V 3/02* (2013.01); *G09F 7/18* (2013.01); *F21Y 2115/10* (2016.08); *G09F 2007/1852* (2013.01)

(58) Field of Classification Search
CPC . G09F 13/0404; G09F 7/18; G09F 2007/1852
See application file for complete search history.

(56) References Cited

U.S. PATENT DOCUMENTS 1,169,254 A * 1/1916 Gast .................... G09F 13/0404 362/812
1,192,982 A * 8/1916 Bristol et al. ....... G09F 13/0404 40/552

(Continued)

FOREIGN PATENT DOCUMENTS

CN 204494269 U 7/2015
CN 110197631 A 9/2019

(Continued)

OTHER PUBLICATIONS

International Search Report and Written Opinion for PCT/CN2022/133017 mailed Feb. 10, 2023.

*Primary Examiner* — Gary C Hoge
(74) *Attorney, Agent, or Firm* — Dorsey & Whitney LLP

(57) ABSTRACT

The disclosure relates to the field of lamp technology, and provides innovative magnetic light-emitting sign, including a light-emitting character bottom housing structure, both front and rear sides of the light-emitting character bottom housing structure are hollow, two bottom covers are fixedly mounted on a bottom wall surface of light-emitting character bottom housing structure, an LED light panel is provided inside the light-emitting character bottom housing structure, the LED light panel is fixed on an inner wall of the light-emitting character bottom housing structure by means of a colloid, a side wall of the LED light panel is provided with a plurality of LED lamp beads spaced equally, light guide covers are fixedly mounted on both front and rear ends of the inner wall of the light-emitting character bottom housing structure, a bottom end of each of the light guide covers is fitted to the side wall of the bottom cover.

6 Claims, 6 Drawing Sheets

(51) Int. Cl.

| | |
|---|---|
| ***G09F 7/18*** | (2006.01) |
| *F21Y 115/10* | (2016.01) |

(56) References Cited

U.S. PATENT DOCUMENTS

| | | | | |
|---|---|---|---|---|
| 3,440,749 | A * | 4/1969 | Jonz | G09F 13/0404 40/552 |
| 3,755,943 | A * | 9/1973 | Cesarotti | G09F 13/0404 40/552 |
| 6,042,248 | A * | 3/2000 | Hannah | G09F 13/0404 362/249.14 |
| 7,118,251 | B1 * | 10/2006 | Chambers | G09F 13/0404 362/311.03 |
| 2002/0159257 | A1 * | 10/2002 | Grajcar | F21S 4/20 40/551 |
| 2003/0009924 | A1 * | 1/2003 | Sajadian | G09F 13/0404 362/362 |
| 2004/0255497 | A1 * | 12/2004 | Venkataraman | G09F 13/04 40/551 |
| 2005/0231943 | A1 * | 10/2005 | Sloan | G09F 13/22 362/225 |
| 2010/0064559 | A1 * | 3/2010 | Dal Cavaliere | B26F 3/004 40/564 |
| 2014/0016298 | A1 * | 1/2014 | Lind | F21S 4/20 362/23.14 |
| 2014/0268741 | A1 * | 9/2014 | Quaal | G09F 13/0404 362/235 |
| 2016/0225295 | A1 * | 8/2016 | Yoon | G09F 13/22 |
| 2017/0025048 | A1 * | 1/2017 | Lee | G09F 13/0404 |
| 2017/0184290 | A1 | 6/2017 | Chiu | |
| 2019/0160512 | A1 * | 5/2019 | Lim | B29C 53/40 |
| 2020/0273383 | A1 * | 8/2020 | Deng | G09F 13/22 |

FOREIGN PATENT DOCUMENTS

| | | | |
|---|---|---|---|
| CN | 110197633 | A | 9/2019 |
| CN | 209543845 | U | 10/2019 |
| CN | 110707446 | A | 1/2020 |
| CN | 209947359 | U | 1/2020 |
| CN | 210777717 | U | 6/2020 |
| CN | 216902174 | U | 7/2022 |
| KR | 20140122591 | A | 10/2014 |
| KR | 101626724 | B1 | 6/2016 |

* cited by examiner

INNOVATIVE MAGNETIC LIGHT-EMITTING SIGN

CROSS REFERENCES TO RELATED APPLICATION

The present application is a US national stage application of PCT international application PCT/CN2022/133017, filed on Nov. 18, 2022, which claims priority to Chinese patent application No. 202220075442.2, titled "Innovative Magnetic Light-Emitting Sign", and filed on Jan. 12, 2022, the contents of each of which are hereby incorporated by reference in its entirety.

TECHNICAL FIELD

The present disclosure relates to the field of lamp technology, and particularly to an innovative magnetic light-emitting sign.

BACKGROUND

Signage, as the name implies, is a signboard for making a sign with text, patterns and other content on it to indicate the direction and serve as a warning. Common signages include public welfare signages, cultural signages, indicator signages, and warning signages.

The contents of the signages and signs of traditional crafts need to be customized, and the customized contents are used once. The entire signage needs to be customized again while changing the contents, accordingly the entire cost is high and the manufacturing period is long. Customers can not freely change the content, which needs to be manufactured by the manufacturer. A lot of material and time are wasted.

To this end, an innovative magnetic light-emitting sign is provided.

SUMMARY

In view of this, in order to address the above technical problem, it is necessary to provide an innovative magnetic light-emitting sign.

In order to achieve the above purpose, the present disclosure provides the following technical solution. An innovative magnetic light-emitting sign includes a light-emitting character bottom housing structure, wherein both front and rear sides of the light-emitting character bottom housing structure are hollow, two bottom covers are fixedly mounted on a bottom wall surface of the light-emitting character bottom housing structure, an LED light panel is provided inside the light-emitting character bottom housing structure, the LED light panel is fixed on an inner wall of the light-emitting character bottom housing structure by means of a colloid, a side wall of the LED light panel is provided with a plurality of LED lamp beads spaced equally, light guide covers are fixedly mounted on both front and rear ends of the inner wall of the light-emitting character bottom housing structure, a bottom end of each of the light guide covers is fitted to the side wall of the bottom cover, stepped processing is performed on an edge of a side of each of the light guide covers fitted to the light-emitting character bottom housing structure.

Optionally, a screw is provided outside the bottom cover, a lateral wall of the bottom cover adjacent to the rear side is provided with a hole, an inner wall of the bottom cover adjacent to the front side is provided with a central round hole corresponding to the hole, the screw passes through the hole and is connected to an inner wall thread of the central round hole, two pogo pins are provided inside the bottom cover, a side wall inside the bottom cover is provided with two corresponding fixing grooves, two bottom ends of the two fixing grooves are both in communication with an outside, side walls of the two pogo pins are respectively fixedly mounted in the corresponding fixing grooves, the bottom ends of the pogo pins extend to the outside through the fixing grooves, positive and negative ends of the LED lamp panel are electrically connected to two wires, bottom ends of the two wires are electrically connected to the two pogo pins, a magnetic block is fixedly mounted on a bottom wall surface of the bottom cover, wherein a top end of the magnetic block extends inside the bottom cover, left and right sidewalls of the magnetic block correspond to the two fixing grooves adjacent respectively.

Optionally, the light-emitting character bottom housing structure, the light guide cover and the LED lamp panel form an N-shape.

Optionally, the light-emitting character bottom housing structure, the light guide cover and the LED lamp panel form a heart shape.

Optionally, the light-emitting character bottom housing structure, the light guide cover and the LED lamp panel form a triangular shape.

Optionally, the light-emitting character bottom housing structure, the light guide cover and the LED lamp panel form a B-shape.

Optionally, the light-emitting character bottom housing structure, the light guide cover and the LED lamp panel form a C-shape.

Advantages:

(1) As for the innovative magnetic light-emitting sign, through the embodiments I to VI, the shape formed by the light-emitting character bottom housing structure, the light guide cover and the LED lamp panel can be changed arbitrarily. English letter-shaped signs, Chinese character-shaped sings, and sign patterns produced by using the innovative magnetic light-emitting sign technique, can be freely combined on the mounting rail, and information can be replaced conveniently at any time. Since the bottom cover is arranged inside the external rail, a distance among various shapes can be adjusted by pushing the light-emitting character bottom housing structure, so that a distance between different light-emitting character bottom housing structures can be changed conveniently according to actual requirements, thereby implementing a rapid DIY of sign display.

(2) As for the innovative magnetic light-emitting sign, the two pogo pins are exposed outside the bottom cover, the bottom cover is placed inside the external rail; when there exists a magnetic material inside the external rail attracting the magnetic block, the magnetic force may push the pogo pins to form a complete contact with a power supply terminal on the other side, to implement a circuit path. The pogo pins are connected to the external power supply, the current may be transmitted to the interior of the LED lamp panel, which is convenient to control the LED lamp beads to work. The light emitted by LED lamp beads passes through the light guide covers to form the neon-like light-emitting sign effect.

(3) As for the innovative magnetic light-emitting sign, the stepped processing is performed on an edge of a side of the light guide cover fitted to the light-emitting character bottom housing structure, in order to facilitate the light guide cover to completely cover the groove structure of the light-emitting character bottom housing structure, and further facilitate ultrasonic bonding therebetween. The bottom end of the light guide cover is fitted to the side wall of the bottom cover, thereby avoiding an interspace on the side wall of the light-emitting character bottom housing structure which may result in light infiltration.

BRIEF DESCRIPTION OF THE DRAWINGS

In order to illustrate more clearly the embodiments of the present disclosure or the technical solutions in the existing technique, accompanying drawings required in the description of the embodiments or the existing technique will be briefly described below. Obviously, the drawings in the following description are merely exemplary, and drawings of other embodiments may be obtained by those skilled in the art according to the provided drawings without creative efforts.

The structure, proportion, size and the like shown in the specification are merely used for cooperating with the content disclosed in the specification for people familiar with the technology to understand and read, rather than limiting the implementation of the disclosure, accordingly have no technical substantive meaning. Any structural modification, change in the proportion relation or adjustment of the size shall all fall within the scope of the disclosure without affecting the effects generated and the purposes achieved by the present disclosure.

REFERENCE SIGNS

Figure 1:
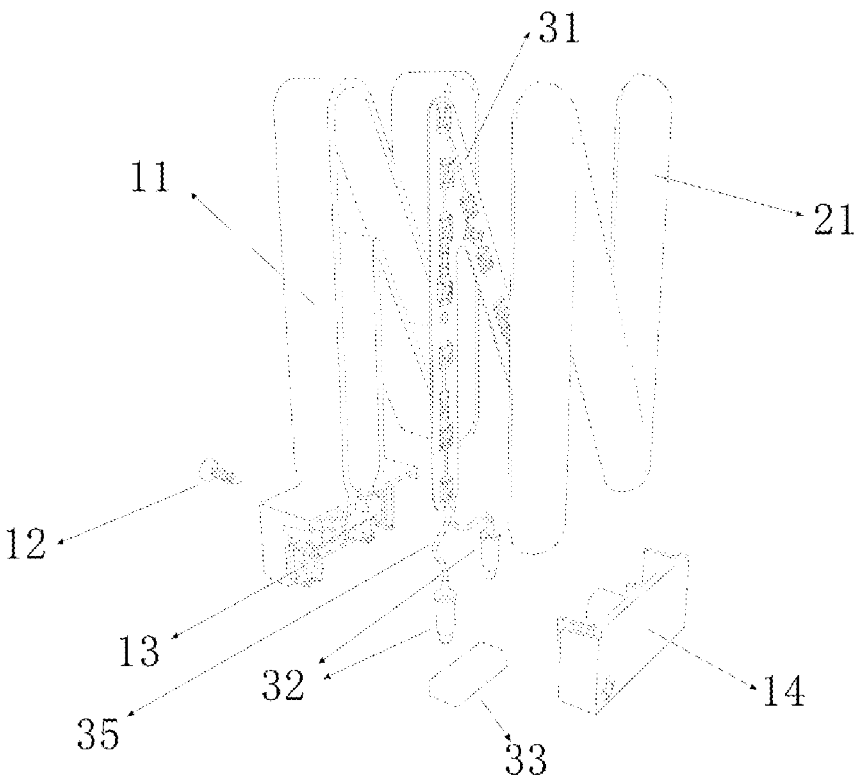
FIG. 1 is a disassembling side view of a light-emitting character according to the present disclosure.
Figure 2:
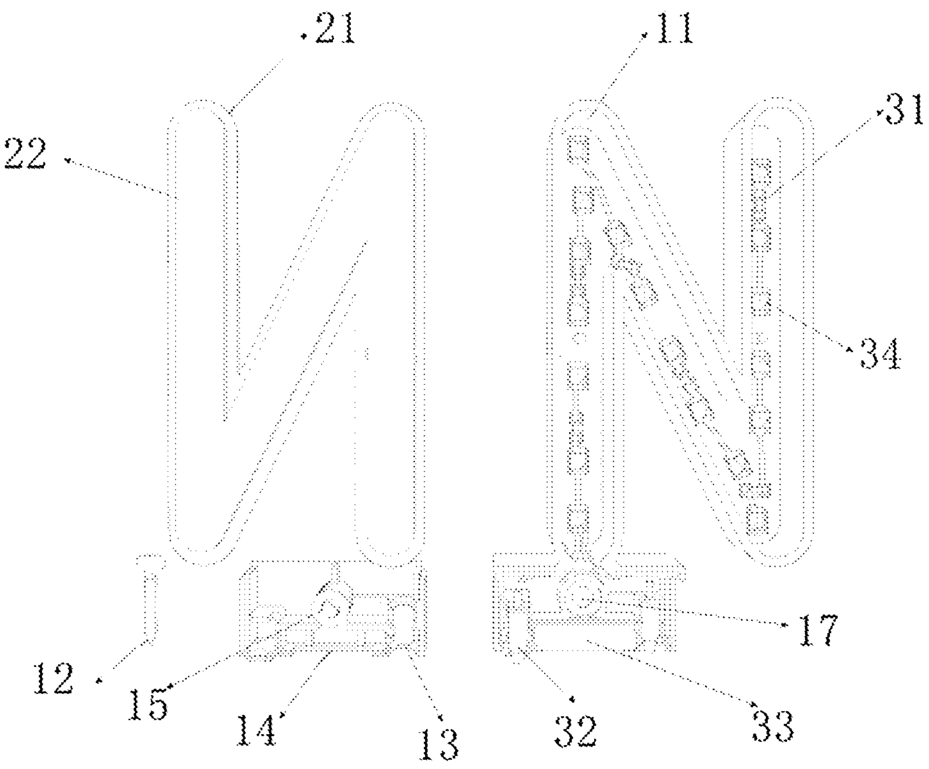
FIG. 2 is a disassembling desktop flat view of a light-emitting character according to the present disclosure.
Figure 3:
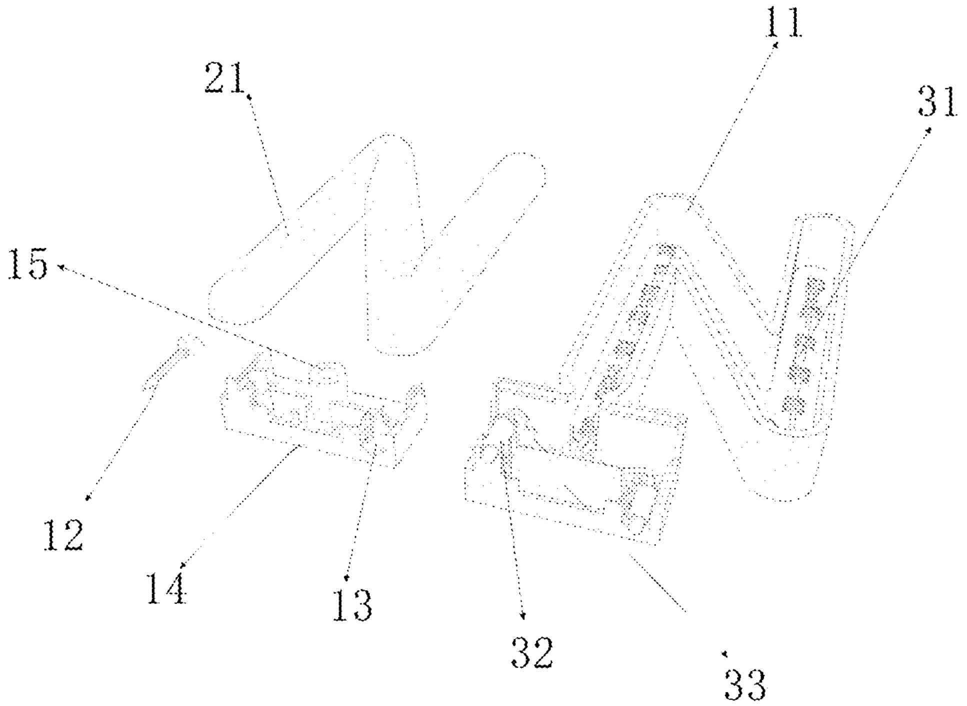
FIG. 3 is a disassembling desktop side view of a light-emitting character according to the present disclosure.
Figure 4:
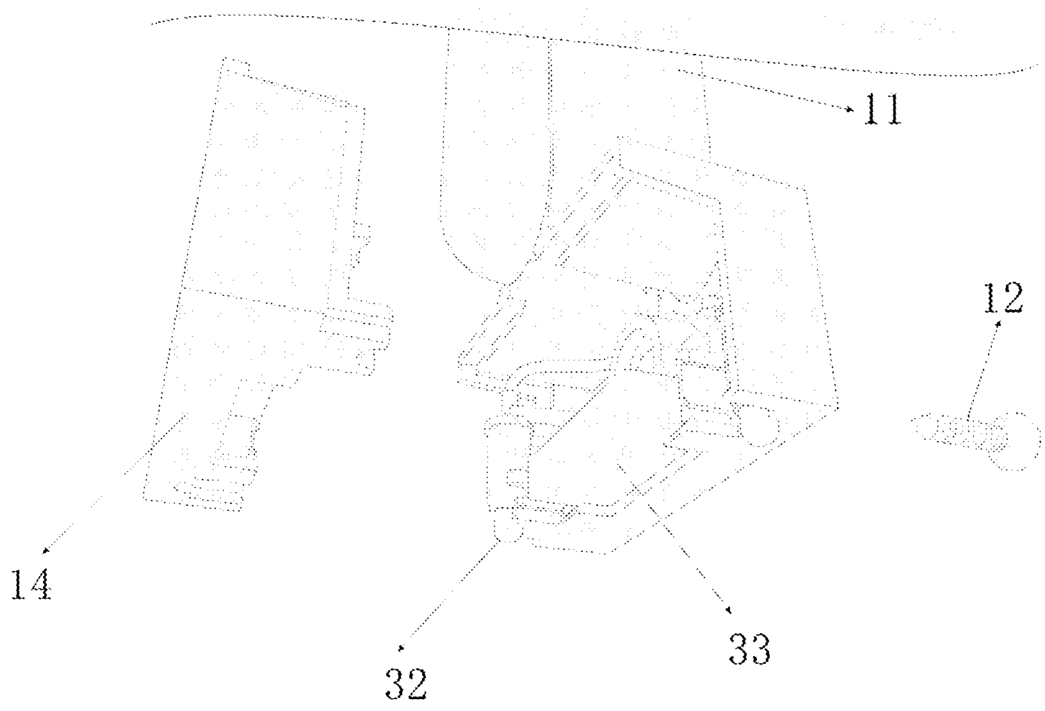
FIG. 4 is a disassembling bottom side view of a light-emitting character according to the present disclosure.
Figure 5:
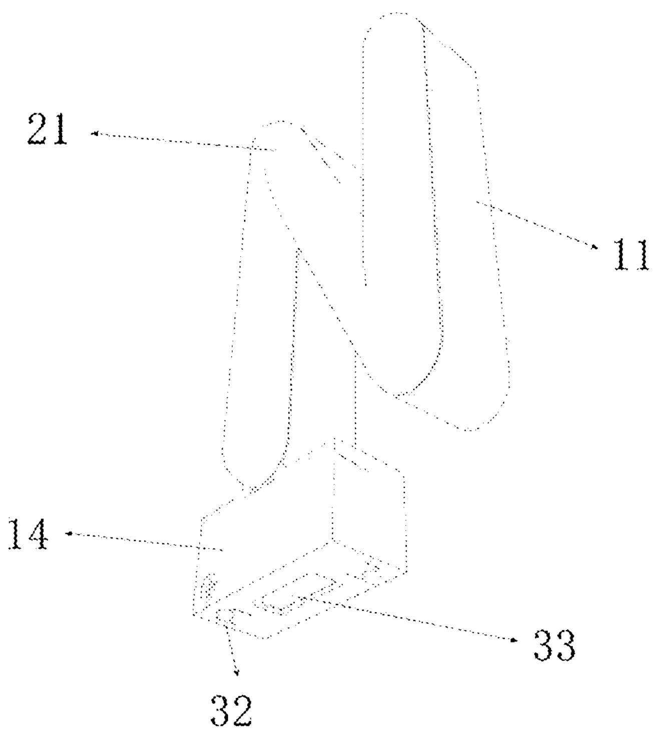
FIG. 5 is a side view of a combination of light-emitting characters according to the present disclosure.

11, light-emitting character bottom housing structure; 31, LED lamp panel; 32, pogo pin; 33, magnetic block; 14, bottom cover; 21, light guide cover; 35, wire; 14, bottom cover; 12, screw; 13, a fixing groove; 17, hole; 15, central round hole; 34, LED lamp bead; 41, housing I; 42, housing II; 43, housing III; 44, housing IV; 45, housing V.

DETAILED DESCRIPTION

The technical solution in the embodiments of the present disclosure will be elaborated clearly and comprehensively in combination with the accompanying drawings. Obviously, the described embodiments are merely some embodiments of the present disclosure, not all the embodiments. Based on the embodiments in the present disclosure, all other embodiments obtained by those skilled in the art without creative efforts belong to the scope of protection of the present disclosure.

Example I: An innovative magnetic light-emitting sign, as shown in FIGS. 1-5, includes a light-emitting character bottom housing structure 11. Both front and rear sides of the light-emitting character bottom housing structure 11 are hollow, and two bottom covers 14 are fixedly mounted on a bottom wall surface of the light-emitting character bottom housing structure 11. The light-emitting character bottom housing structure 11 and the bottom covers 14 can be manufactured by injection molding with an ABS material, or by cutting an acrylic material.

An LED light panel 31 is provided inside the light-emitting character bottom housing structure 11. The LED light panel 31 is fixed on an inner wall of the light-emitting character bottom housing structure 11 by means of a colloid. A side wall of the LED light panel 31 is provided with a plurality of LED lamp beads 34 spaced equally. By choosing different color light sources, and replacing different LED lamp beads 34, the interior of the light-emitting character bottom housing structure 11 can display different luminous colors.

Light guide covers 21 are fixedly mounted on both front and rear ends of the inner wall of the light-emitting character bottom housing structure 11. A bottom end of the light guide cover 21 is fitted to the side wall of the bottom cover 14. The light guide cover 21 is a light guide material, such as PC or acrylic material. The bottom end of the light guide cover 21 is fitted to the side wall of the bottom cover 14, thereby avoiding an interspace on the side wall of the light-emitting character bottom housing structure 11 which may result in light infiltration.

Two pogo pins 32 are provided inside the bottom cover 14.

The opposing sidewalls of the two bottom covers 14 are each provided with two corresponding fixing grooves 13, two bottom ends of the fixing grooves 13 are both in communication with the outside. Side walls of the two pogo pins 32 are respectively fixedly mounted in the corresponding fixing grooves 13. The bottom ends of the pogo pins 32 extend to the outside through the fixing grooves 13.

The positive and negative ends of the LED lamp panel 31 are electrically connected to wires 35. Bottom ends of the two wires 35 are electrically connected to the two pogo pins 32. The pogo pins 32 are connected to an external power supply, a current may be transmitted to the interior of the LED lamp panel 31, which is convenient to control the LED lamp beads 34 to work. The light emitted by LED lamp beads 34 passes through the light guide covers 21 to form a neon-like light-emitting sign effect.

A magnetic block 33 is fixedly mounted on a bottom wall surface of the bottom cover 14, in which a top end of the magnetic block 33 extends inside the bottom cover 14. Left and right sidewalls of the magnetic block 33 correspond to the two fixing grooves 13 adjacent respectively.

A stepped structure is performed on an edge of a side of the light guide cover 21 fitted to the light-emitting character bottom housing structure 11, in order to facilitate the light guide cover to completely cover the groove structure of the light-emitting character bottom housing structure 11, and also facilitate ultrasonic bonding therebetween.

A screw 12 is provided outside the bottom cover 14. A lateral wall of the bottom cover 14 adjacent to the rear side is provided with a hole 17. An inner wall of the bottom cover 14 adjacent to the front side is provided with a central round hole 15 corresponding to the hole 17. The screw 12 passes through the hole 17 and is connected to an inner wall thread of the central round hole 15.

Two ends of the two pogo pins 32 are exposed outside the bottom cover 14. The bottom cover 14 is placed inside an external rail. When there exists a magnetic material inside the external rail attracting the magnetic block, a magnetic force may push the pogo pins to form a complete contact with a power supply terminal on the other side, to implement a circuit path.

The light-emitting character bottom housing structure 11, the light guide cover 21 and the LED lamp panel 31 form an N-shape, respectively.

Figure 6:
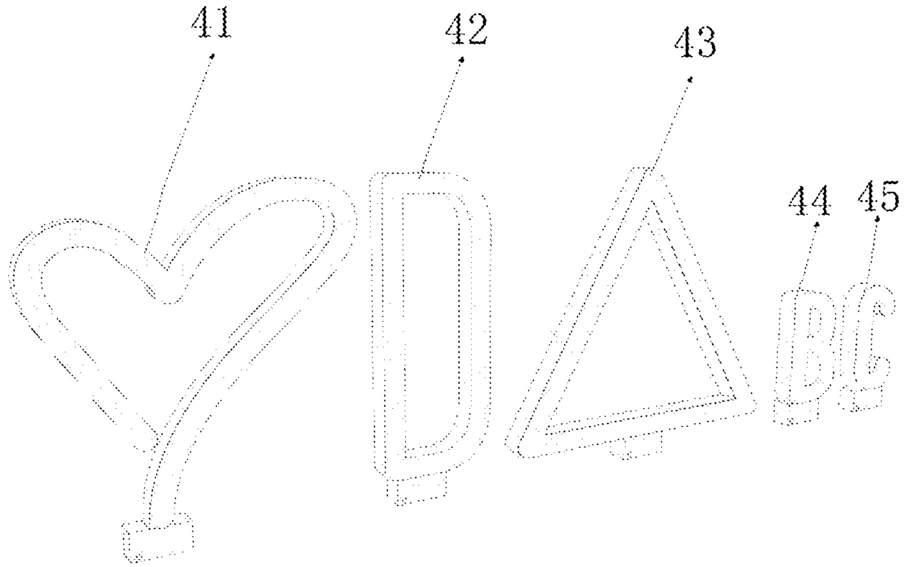
FIG. 6 is a schematic diagram illustrating shapes according to a plurality of embodiments of the present disclosure.

Embodiment II: based on the embodiment I and referring to FIG. 6, the light-emitting character bottom housing structure 11, the light guide cover 21 and the LED lamp panel 31 form a heart shape, respectively.

Embodiment III: based on the embodiment I and referring to FIG. 6, the light-emitting character bottom housing structure 11, the light guide cover 21 and the LED lamp panel 31 form a D-shape, respectively.

Embodiment IV: based on the embodiment I and referring to FIG. 6, the light-emitting character bottom housing structure 11, the light guide cover 21 and the LED lamp panel 31 form a triangular shape, respectively.

Embodiment V: based on the embodiment I and referring to FIG. 6, the light-emitting character bottom housing structure 11, the light guide cover 21 and the LED lamp panel 31 form a B-shape, respectively.

Embodiment VI: based on the embodiment I and referring to FIG. 6, the light-emitting character bottom housing structure 11, the light guide cover 21 and the LED lamp panel 31 form a C-shape.

The working principle of the present disclosure is provided as follows.

When in use, through the embodiments I to VI, the shape formed by the light-emitting character bottom housing structure 11, the light guide cover 21 and the LED lamp panel 31 can be changed flexibly. English letter-shaped signs, Chinese character-shaped sings, and sign patterns produced by using the innovative magnetic light-emitting sign technique, can be freely combined on the mounting rail, and information can be replaced conveniently at any time. Since the bottom cover 14 is arranged inside the external rail, a distance among signs of various shapes can be adjusted by moving the light-emitting character bottom housing structure 11, a distance between different light-emitting character bottom housing structures 11 can be changed conveniently according to actual requirements, thereby implementing a rapid DIY of sign display.

When in use, the two pogo pins 32 are exposed outside the bottom covers 14, the bottom cover 14 is placed inside the external rail; when there exists a magnetic material inside the external rail attracting the magnetic block, the magnetic force may push the pogo pins to form a complete contact with a power supply terminal on the other side, to implement a circuit path. The pogo pins 32 are connected to the external power supply, the current may be transmitted to the interior of the LED lamp panel 31, which is convenient to control the LED lamp beads 34 to work. The light emitted by LED lamp beads 34 passes through the light guide covers 21 to form the neon-like light-emitting sign effect.

When in use, the stepped processing is performed on an edge of a side of the light guide cover 21 fitted to the light-emitting character bottom housing structure 11, in order to facilitate the light guide cover to completely cover the groove structure of the light-emitting character bottom housing structure 11, and further facilitate ultrasonic bonding therebetween. The bottom end of the light guide cover 21 is fitted to the side wall of the bottom cover 14, thereby avoiding an interspace on the side wall of the light-emitting character bottom housing structure 11 which may result in light infiltration.

The basic principle, main limitations and the advantages of the present disclosure are shown and described above. Those skilled in the art should appreciate that the present disclosure is not limited by the above embodiments, the above embodiments and description only illustrate the principle of the present disclosure, and those skilled in the art can make various variations and improvements to the present disclosure without departing from the spirit and scope of the present disclosure, and these variations and improvements all fall within the scope of protection of the present disclosure. The protection scope of the present disclosure shall be subject to the appended claims and equivalents thereof.

What is claimed is:

1. An innovative magnetic light-emitting sign, comprising:

a light-emitting character bottom housing structure, wherein both front and rear sides of the light-emitting character bottom housing structure are hollow, two bottom covers are fixedly mounted on a bottom wall surface of the light-emitting character bottom housing structure, and a light emitting diode (LED) light panel is provided inside the light-emitting character bottom housing structure, the LED light panel is fixed on an inner wall of the light-emitting character bottom housing structure by a colloid, a side wall of the LED light panel is provided with a plurality of LED lamp beads spaced equally, a light guide cover is fixedly mounted on a front end of the inner wall of the light-emitting character bottom housing structure, a bottom end of each of the light guide covers is fitted to the side wall of the bottom cover, a stepped structure is performed on an edge of a side of each of the light guide covers fitted to the light-emitting character bottom housing structure;

wherein a screw is provided outside the bottom cover, a lateral wall of the bottom cover adjacent to the rear side is provided with a hole, an inner wall of the bottom cover adjacent to the front side is provided with a central round hole corresponding to the hole, the screw passes through the hole and is connected to an inner wall thread of the central round hole, two pogo pins are provided inside the bottom cover, a side wall inside the bottom cover is provided with two corresponding fixing grooves, two bottom ends of the two fixing grooves are both in communication with an outside, side walls of the two pogo pins are respectively fixedly mounted in the corresponding fixing grooves, the bottom ends of the pogo pins extend to the outside through the fixing grooves, positive and negative ends of the LED lamp panel are electrically connected to two wires, bottom ends of the two wires are electrically connected to the two pogo pins, a magnetic block is fixedly mounted on a bottom wall surface of the bottom cover, wherein a top end of the magnetic block extends inside the bottom cover, left and right sidewalls of the magnetic block correspond to the two fixing grooves adjacent respectively.

2. The innovative magnetic light-emitting sign according to claim 1, wherein the light-emitting character bottom housing structure, the light guide cover and the LED lamp panel form an N-shape.

3. The innovative magnetic light-emitting sign according to claim 1, wherein the light-emitting character bottom housing structure, the light guide cover and the LED lamp panel form a heart shape.

4. The innovative magnetic light-emitting sign according to claim 1, wherein the light-emitting character bottom housing structure, the light guide cover and the LED lamp panel form a triangular shape.

5. The innovative magnetic light-emitting sign according to claim 1, wherein the light-emitting character bottom housing structure, the light guide cover and the LED lamp panel form a B-shape.

6. The innovative magnetic light-emitting sign according to claim 1, wherein the light-emitting character bottom housing structure, the light guide cover and the LED lamp panel form a C-shape.

* * * * *